US010877749B1

(12) United States Patent
Muske et al.

(10) Patent No.: US 10,877,749 B1
(45) Date of Patent: Dec. 29, 2020

(54) METHOD AND SYSTEM FOR NON-IMPACTING CONTROL DEPENDENCIES BASED REPOSITIONING OF STATIC ANALYSIS ALARMS

(71) Applicant: Tata Consultancy Services Limited, Mumbai (IN)

(72) Inventors: Tukaram Bhagwat Muske, Pune (IN); Rohith Talluri, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/824,880

(22) Filed: Mar. 20, 2020

(30) Foreign Application Priority Data

Nov. 29, 2019 (IN) .............................. 201921049196

(51) Int. Cl.
G06F 9/44 (2018.01)
G06F 8/75 (2018.01)
G06F 11/32 (2006.01)
G06F 8/41 (2018.01)

(52) U.S. Cl.
CPC ................ G06F 8/75 (2013.01); G06F 8/433 (2013.01); G06F 11/327 (2013.01)

(58) Field of Classification Search
CPC ........... G06F 8/75; G06F 8/433; G06F 11/327
See application file for complete search history.

(56) References Cited

U.S. PATENT DOCUMENTS

| 2010/0031358 | A1* | 2/2010 | Elovici | .................... H04L 43/00 726/24 |
| 2013/0091578 | A1* | 4/2013 | Bisht | ....................... G06F 21/53 726/25 |
| 2018/0046564 | A1 | 2/2018 | Muske | |

FOREIGN PATENT DOCUMENTS

CN 106354632 1/2017

* cited by examiner

*Primary Examiner* — Chuck O Kendall
(74) *Attorney, Agent, or Firm* — Finnegan, Henderson, Farabow, Garrett & Dunner, LLP

(57) ABSTRACT

This disclosure relates generally to static analysis of the program code, and more specifically to method and system for non-impacting control dependencies (NCDs)-based repositioning of static analysis alarms in a program code. By determining each of the transitive control dependencies (controlling conditions) of each of the original alarms either as NCD or an impacting control dependency (ICD) of the corresponding alarm, the system is able to reposition and group similar alarms even if the alarms are associated with or are under different conditional statements by considering the effect of the NCDs and ICDs of the alarms, and the repositioning further reduces number of the alarms.

19 Claims, 4 Drawing Sheets

US 10,877,749 B1

METHOD AND SYSTEM FOR NON-IMPACTING CONTROL DEPENDENCIES BASED REPOSITIONING OF STATIC ANALYSIS ALARMS

PRIORITY CLAIM

This U.S. patent application claims priority under 35 U.S.C. § 119 to: India Application No. 201921049196, filed on Nov. 29, 2019. The entire contents of the aforementioned application are incorporated herein by reference.

TECHNICAL FIELD

This disclosure relates generally to program code analysis, and more particularly to computing Non-impacting Control Dependencies (NCDs) of static analysis alarms in a program code, and performing repositioning of the static analysis alarms based on their non-impacting control dependencies to reduce the number of alarms.

BACKGROUND

Testing is a process of validating and verifying if a software program or application or product meets the expected business and technical requirements. A widely used technique in practice for ensuring software program quality and reliability is static analysis, wherein a software program or application code is analyzed to detect defects without actually executing the program or application code. During static analysis, an application code is analyzed using static analysis tools, wherein the tools generate one or more static analysis warnings/alarms along with reporting of safe and error program points in the application code. A static analysis alarm generated by static analysis tools corresponding to a program point of interest may or may not represent a defect/error, and it is a warning message to the user notifying the tool user about a potential error at that program point. The alarms generated are reported to user by the static analysis tools to decide the safety at the program points in the application code corresponding to the alarms.

In practice, a large number of static analysis alarms are generated by the static analysis tools and most of them are falsely generated due to the approximations used by those tools. The falsely generated static analysis alarms are referred to as false positives, because they do not represent a defect. Further, the task of classifying the generated static analysis alarms into false positives and true defects/errors is often manual, very tedious and costly. The large number of static analysis alarms generated and the cost involved in classifying the generated static analysis alarms manually have been recognized as major concerns in adoption of static analysis tools in practice.

The inventors here have recognized several technical problems with such conventional systems, as explained below. A few existing methods group similar or related static analysis alarms together and represent each group as a single alarm. However, these methods to grouping of static analysis alarms sometimes fail to group alarms related by the same variables or causes, and this failure results in redundancy in reporting of the static analysis alarms.

Repositioning of alarms is performed to reposition two or more similar or related alarms to a program point in the program code, where the alarms can be merged together and replaced by a single alarm. Such repositioning of alarms reduces the overall number of alarms, and seen as one of the techniques to group the similar or related alarms together and reduce the overall number of alarms. However, one limitation of this repositioning technique is that the technique groups and repositions similar alarms which are associated with the same conditional statement only, and in turn fails to reposition and group alarms that are associated with or are under different conditional statements. Hence, the repositioning technique does not reduce the number of alarms in such cases. As a result, the grouping and repositioning of the alarms is not very effective in terms of reduction in the number of alarms.

SUMMARY

Embodiments of the present disclosure present technological improvements as solutions to one or more of the above-mentioned technical problems recognized by the inventors in conventional systems. For example, in one embodiment, a processor implemented method for reducing number of static analysis alarms in a program code by repositioning the static analysis alarms is provided. In this method, the program code is collected as input, via one or more hardware processors. A plurality of original static analysis alarms are generated by performing a static analysis on the program code, via the one or more hardware processors. Further, all transitive control dependencies of each of the plurality of original static analysis alarms are computed via the one or more hardware processors. Further, each of the transitive control dependencies of each of the plurality of original static analysis alarms is computed as one of a non-impacting control dependency or an impacting control dependency to the alarm, via the one or more hardware processors. Further, one or more locations in the program code where each of the plurality of original static alarms can be repositioned to are computed, by considering effect of the impacting and non-impacting control dependencies computed corresponding to the original static analysis alarms, via the one or more hardware processors. Then one or more repositioned alarms corresponding to each of the plurality of original static analysis alarms are created based on the one or more locations computed corresponding to each of the original alarms, via the one or more hardware processors. Further, post-processing of the repositioned alarms is performed to reduce number of the repositioned alarms, via the one or more hardware processors. Further, traceability links between each of the repositioned alarms and corresponding original static analysis alarms generated in the program code are computed, via the one or more hardware processors. Further, reporting the repositioned alarms to the user along with their corresponding original alarms given by the traceability links, via one or more interfaces connected to the system or generating new code from the input program code, wherein the new code has the repositioned alarms denoted in it.

In another embodiment, a system for reducing number of static analysis alarms in a program code by repositioning the static analysis alarms is provided. The system includes one or more hardware processors, one or more communication interfaces, and one or more memory storing a plurality of instructions. The plurality of instructions when executed cause the one or more hardware processors to collect the program code as input. A plurality of original static analysis alarms are generated by performing a static analysis on the program code, via the one or more hardware processors. Further, all transitive control dependencies of each of the plurality of original static analysis alarms are computed via the one or more hardware processors. Further, each of the transitive control dependencies of each of the plurality of original static analysis alarms is computed as one of a non-impacting control dependency or an impacting control dependency to the alarm, via the one or more hardware processors. Further, one or more locations in the program code where each of the plurality of original static alarms can be repositioned to are computed, by considering effect of the impacting and non-impacting control dependencies computed corresponding to the original static analysis alarms, via the one or more hardware processors. Then one or more repositioned alarms corresponding to each of the plurality of original static analysis alarms are created based on the one or more locations computed corresponding to each of the original alarms, via the one or more hardware processors. Further, post-processing of the repositioned alarms is performed to reduce number of the repositioned alarms, via the one or more hardware processors. Further, traceability links between each of the repositioned alarms and corresponding original static analysis alarms generated in the program code are computed, via the one or more hardware processors. Further, reporting the repositioned alarms to the user along with their corresponding original alarms given by the traceability links, via one or more interfaces connected to the system or generating new code from the input program code, wherein the new code has the repositioned alarms denoted in it.

In yet another embodiment, a non-transitory computer readable medium for reducing number of static analysis alarms in a program code by repositioning the static analysis alarms is provided. The non-transitory computer readable medium collects the program code as input, via one or more hardware processors. A plurality of original static analysis alarms are generated by performing a static analysis on the program code, via the one or more hardware processors. Further, all transitive control dependencies of each of the plurality of original static analysis alarms are computed via the one or more hardware processors. Further, each of the transitive control dependencies of each of the plurality of original static analysis alarms is computed as one of a non-impacting control dependency or an impacting control dependency to the alarm, via the one or more hardware processors. Further, one or more locations in the program code where each of the plurality of original static alarms can be repositioned to are computed, by considering effect of the impacting and non-impacting control dependencies computed corresponding to the original static analysis alarms, via the one or more hardware processors. Then one or more repositioned alarms corresponding to each of the plurality of original static analysis alarms are created based on the one or more locations computed corresponding to each of the original alarms, via the one or more hardware processors. Further, post-processing of the repositioned alarms is performed to reduce number of the repositioned alarms, via the one or more hardware processors. Further, traceability links between each of the repositioned alarms and corresponding original static analysis alarms generated in the program code are computed, via the one or more hardware processors. Further, reporting the repositioned alarms to the user along with their corresponding original alarms given by the traceability links, via one or more interfaces connected to the system or generating new code from the input program code, wherein the new code has the repositioned alarms denoted in it.

It is to be understood that both the foregoing general description and the following detailed description are exemplary and explanatory only and are not restrictive of the invention, as claimed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
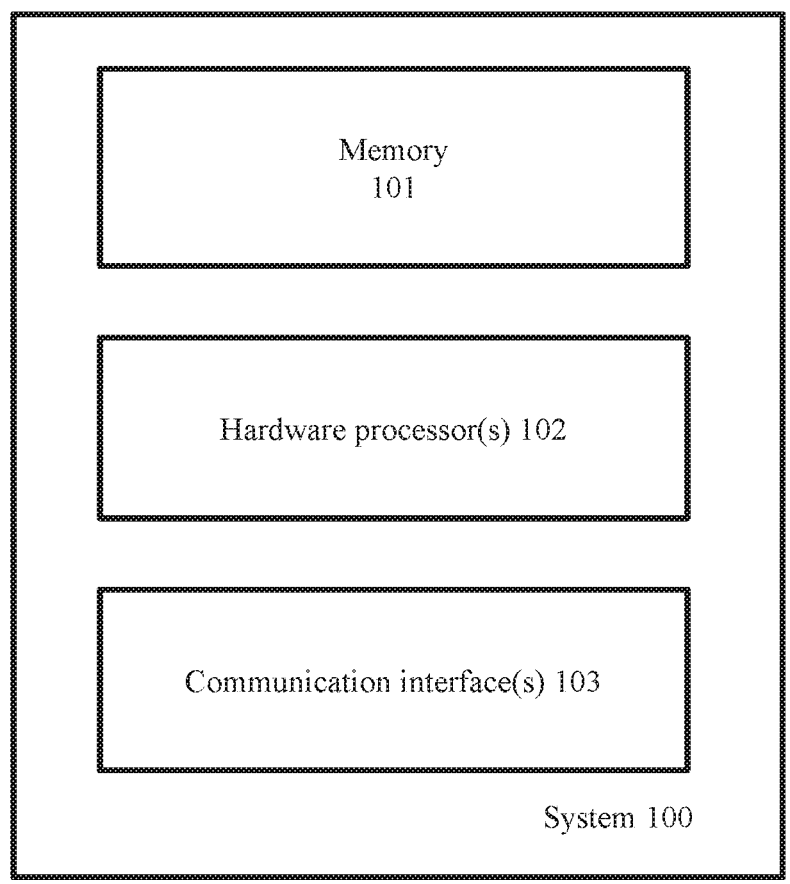
FIG. 1 illustrates a block diagram of a system for repositioning of static alarms, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

In a program code, there may be multiple program points which when executed may cause error in one or more scenarios. For example, consider "code 1a and code 1b (collectively referred to code 1)" below:

```
1  void HoleHMEPBCs (void) {
2  int h2d [309];
3
4  ...
5  fscanf (f_p, "% d", &ny);
6
7  //assert  R7   (0≤ny≤304)
8
9  if (EDGE [2] [i] [0]==0) {
10 h2d [ny+4]= ... ;   A10
11 }
12
13 if (EDGE [2] [i] [0]==1
14 ||EDGE [2] [i] [0]==2) {
15 h2d [ny+4]= ... ;   A15
16 }
17
18 }
```

Code 1a

```
31 void Read_Input_File (void) {
32 ...
33   fscanf (fp, "% d % d", &nx, &ny);
34   fscanf (fp, % s, pos);
35
36 // assert (nx !=0);   (R36)
37   if(strcmp(pos,"DOWN")==0)
38     delt=LX/nx;   [D38]
39
40 // assert (ny=! 0);   (R40)
41   if (strcmp (pos, "RIGHT")==0)
42     delt=LY/ny;   [D42]
43
44   if (strcmp (pos, "UP")==0)
45     delt=LX/nx;   [D45]
46
47   if (strcmp (pos, "LEFT")==0)
48     delt=LY/ny;   [D48]
49 }
```

Code 1b

As can be seen, if value of 'ny' variable taken as input at line 33 of the program code is zero, the same would cause errors at lines 42 and 48 (i.e. division by zero error). Traditional systems generate alarms separately at lines 42 and 48 while performing the static analysis of the program code. Repositioning of static analysis alarms is performed to identify such similar alarms and group them, so that number of static analysis alarms can be reduced. A traditional approach to perform repositioning of static analysis alarms has a limitation that alarms that are part of or are under same conditional statement only are grouped and repositioned. For example, even though the static analysis alarms generated at lines 42 and 48 are similar, the traditional repositioning approach or any technique to group similar alarms fails to group the static analysis alarms generated at lines 42 and 48 because they are associated with different conditional statements i.e. lines 41 and 47 respectively, that is they are under different conditional statements.

The method and system described herein addresses this problem by determining and differentiating control dependencies of the static analysis alarms as impacting or non-impacting to the alarms, and then accordingly grouping and repositioning the static analysis alarms. The process is explained in detail in the following description.

Glossary

1) Control Flow Graph (CFG):

A CFG of a program code is a directed graph $(\aleph, \varepsilon)$, where $\aleph$ is a set of nodes representing program statements (including assignments and conditional statements), and $\varepsilon$ is a set of edges such that an edge (n, n') represents a possible flow of the program control from $n \in \aleph$ to $n' \in \aleph$ without any intervening node. The notion n→n' is used to denote an edge from node n to node n'. Depending on whether a program control flows conditionally or unconditionally along the edge, the edge is labelled as conditional or unconditional. A condition corresponding to a conditional edge u→v is denoted using cond(u→v). Each CFG has a Start and End nodes, which represent entry and exit of the corresponding program. For each node n, pred(n) represents predecessors of n in the graph.

The system 100 considers that except for the Start and End nodes there exists a one-to-one correspondence between the CFG nodes and their corresponding program statements. As a result, the terms 'statement' and 'node' are used interchangeably. $n_m$ denotes node of a program statement at line m.

2) Program Points:

entry (n) and exit (n) denote entry and exit of a node n i.e. program points just before and immediately after execution of statement corresponding to the node 'n', respectively. A program point $p_1$ dominates a program point $p_2$ if every path from the program entry point contains $p_1$. A program point $p_1$ post-dominates a program point $p_2$ if every path from $p_2$ to the program exit contains $p_1$.

3) Data Dependencies:

A variable v present at a program point p is considered to be data dependent on a definition d of v if d is a reaching definition of v at p. Data dependencies of a variable v are definitions on which v is data dependent.

4) Control Dependencies:

A node ω is considered as control dependent on a conditional edge u→v if co post-dominates v, and if ω≠u, ω does not post-dominate u. Control dependencies of a node n or a program point entry (n) or exit (n) are conditional edges on which the node n is control dependent. A conditional edge e is called a transitive control dependency of a program point p if e belongs to transitive closure of control dependencies of p. The notation e→p is used to denote that e is a transitive control dependency of a program point p.

5) Static Analysis Alarms:

A static analysis alarm is reported at a program point where a run-time error corresponding to the alarm is likely to occur. The notation cond(φ) is used to denote an alarm condition of an alarm φ. The alarm condition holds if the corresponding alarm is a false positive. For example, in 'code 1' nx≠0 is the alarm condition for the alarms $D_{38}$ and $D_{45}$. The notion safe values (resp. unsafe values) is used to refer to a set of values of the variables in cond(φ) due to which 0 is a false positive (resp. an error). Conditions of two conditional edges $e_1$ and $e_2$ are considered to be equivalent if cond($e_1$) implies cond($e_2$) and cond($e_2$) implies cond($e_1$). Similarly, two conditional edges n→n' and m→m' are considered as conditional equivalents if (1) their conditions are equivalent, and (2) every variable in their conditions has same data dependencies at exit (n) and exit (m).

Two alarms φ and φ' are considered to be similar if cond(φ) implies cond(φ') or cond(φ') implies cond(φ). An alarm φ is considered as a dominant alarm of the alarm φ φ' if whenever φ is a false positive, φ' is also a false positive. Let $φ_p$ denotes an alarm ra located at a program point p, and thus the transitive control dependencies of $φ_p$ are same as the transitive control dependencies of p. The notation e→0 is used to indicate that e is a transitive control dependency of an alarm φ. A tuple $\langle c,p \rangle$ is used to denote a newly created repositioned alarm at p with c as the alarm condition.

6) Non-Impacting Control Dependency (NCD):

NCD of any of the alarms is a transitive control dependency of the alarm's program point, which does not affect whether the alarm is an error.

7) Impacting Control Dependency (ICD):

ICD of any of the alarms is a transitive control dependency of the alarm's program point, which affects whether the alarm is an error.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates a block diagram of a system for repositioning of static analysis alarms, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

Figure 3:
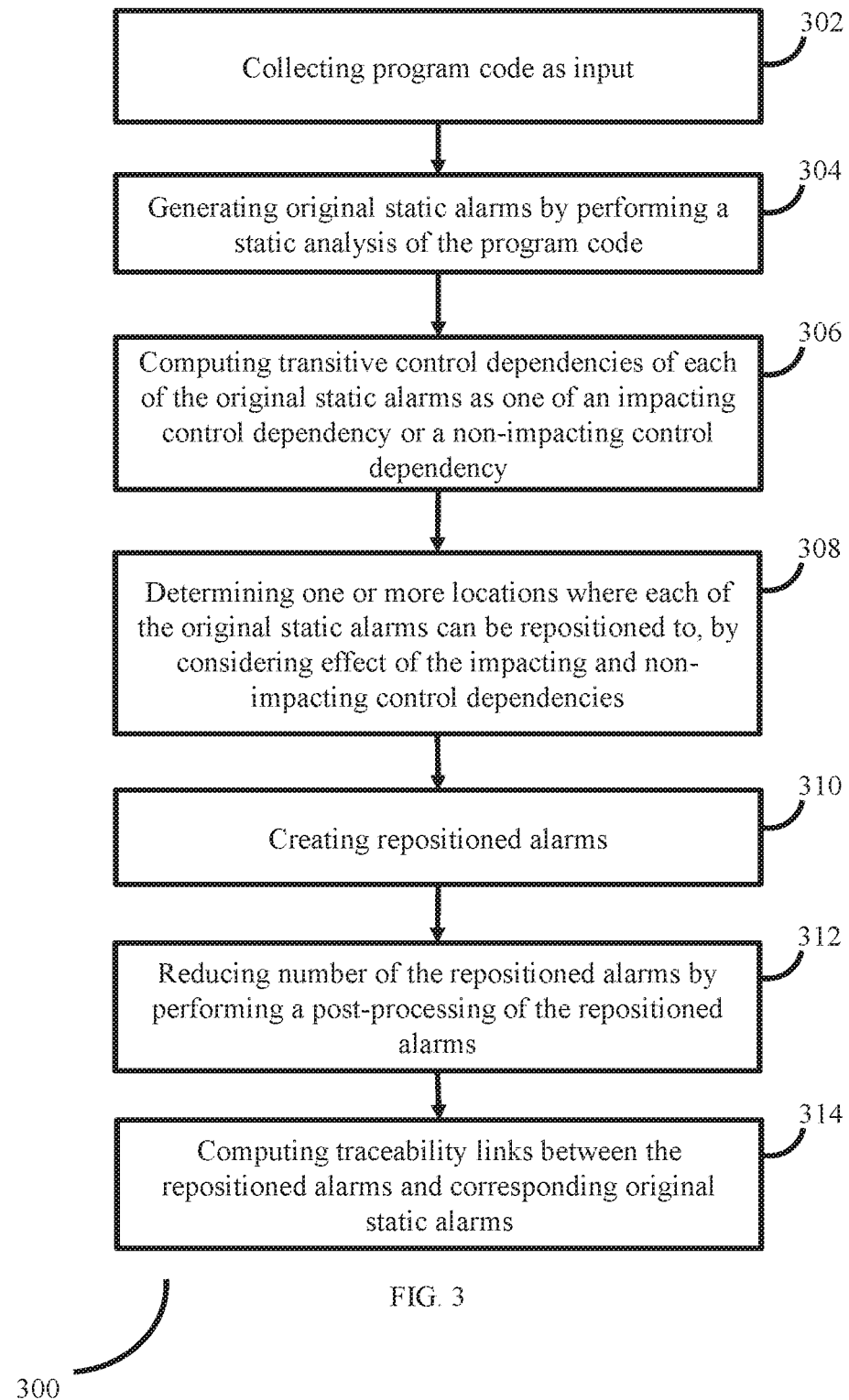
FIG. 3 is a flow diagram depicting steps involved in the process of repositioning of original static alarms in a program code by considering effect of Non-impacting control dependencies (NCDs) and impacting control dependencies (ICDs) of static alarms in a program code, using the system of FIG. 1, according to some embodiments of the present disclosure.
Figure 4:
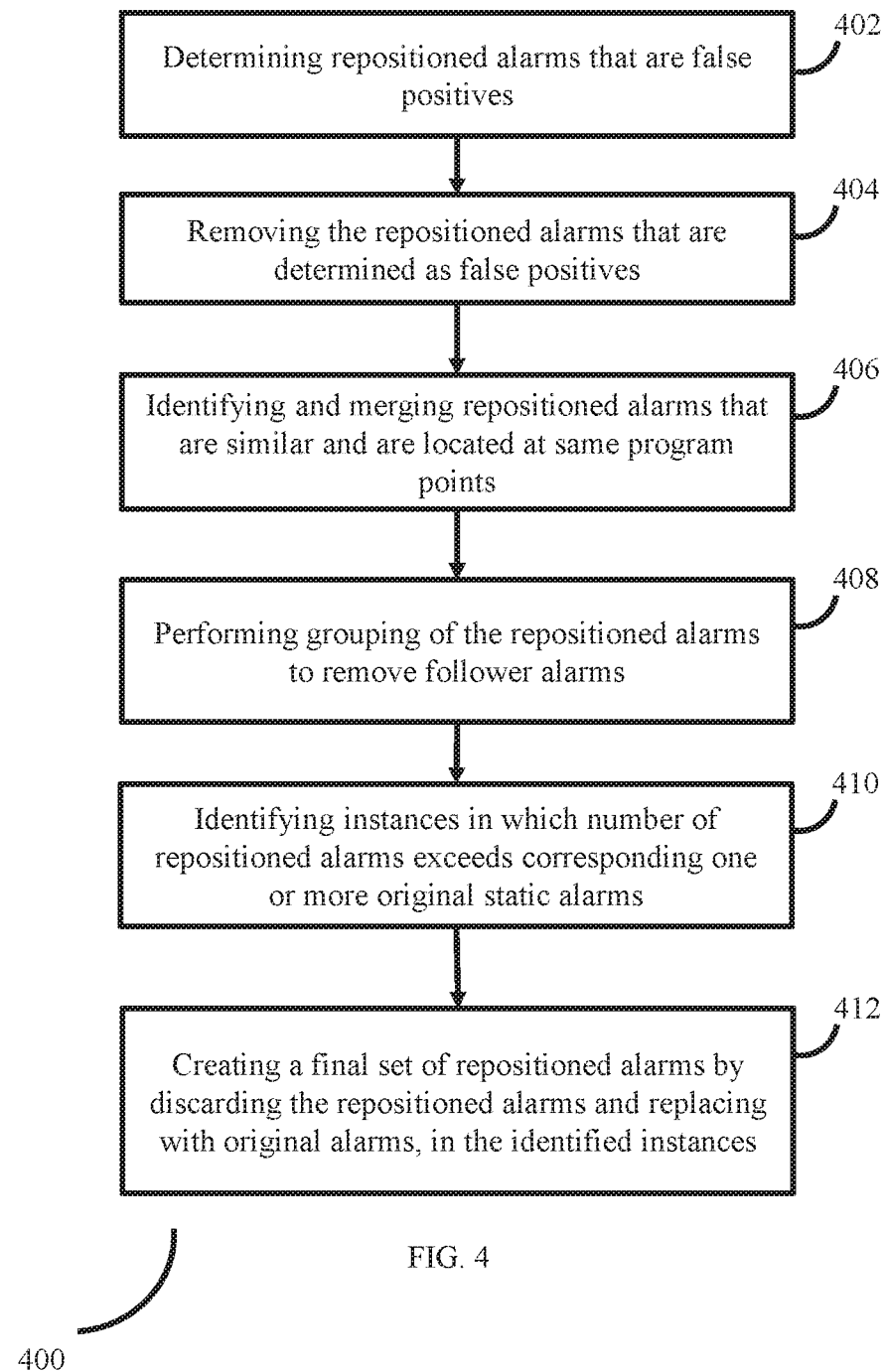
FIG. 4 is a flow diagram depicting steps involved in the process of post-processing of repositioned static alarms, using the system of FIG. 1, in accordance with some embodiments of the present disclosure.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store operational instructions which when executed cause one or more of the hardware processor(s) 102 to perform various actions associated with the repositioning of the static alarms based on their NCDs and ICDs, being handled by the system 100. The repositioning of static analysis alarms based on the NCDs or ICDs of the alarms or the both is referred to as NCDs-based repositioning. The various steps involved in the process of NCDs-based repositioning of static analysis alarms are explained with description of FIG. 3 and FIG. 4. All the steps in FIG. 3 and FIG. 4 are explained with reference to the system of FIG. 1 and the system implementation and associated components depicted in FIG. 2.

Figure 2:
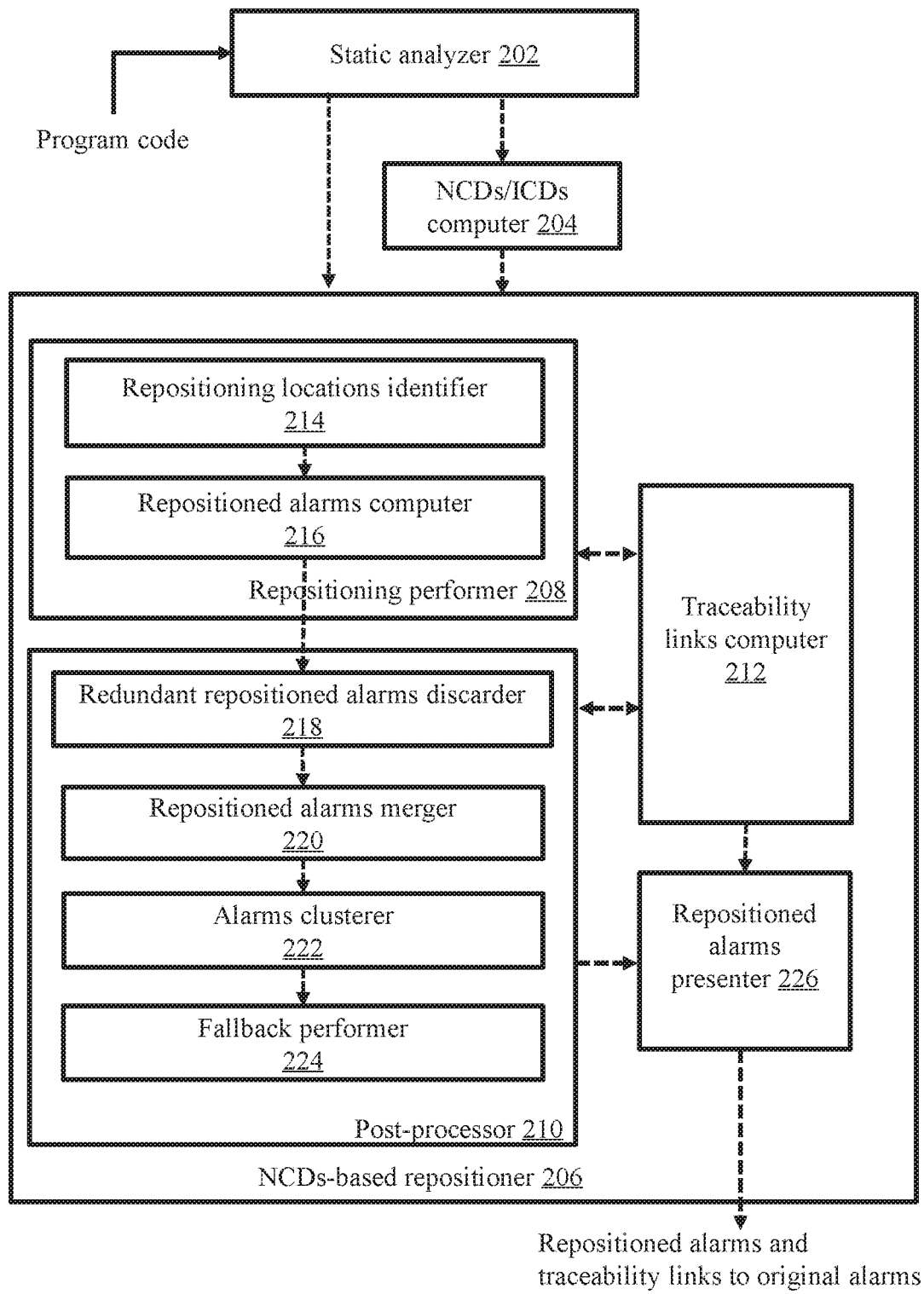
FIG. 2 is a functional block diagram of an example implementation of the system of FIG. 1, according to some embodiments of the present disclosure.

FIG. 2 is a functional block diagram of an example implementation of the system of FIG. 1, according to some embodiments of the present disclosure. In this example implementation, the system 100 comprises a static analyzer 202, a Non-impacting Control Dependencies (NCDs)/Impacting Control Dependencies (ICDs) computer 204, and an NCDs-based repositioner 206. In an embodiment, in terms of functionalities being handled, the components 202 through 206 are implementation of the hardware processors 102. The NCDs-based repositioner 206 further comprises a repositioning performer 208, a post-processor 210, a traceability links computer 212, and a repositioned alarms presenter 226. The repositioning performer 208 further includes a repositioning locations identifier 214 and a repositioned alarms computer 216. The post processor 210 includes a redundant repositioned alarms discarder 218, a repositioned alarms merger 220, an alarms clusterer 222, and a fallback performer 224.

The program code that has been collected as input is processed by the static analyzer 202. The static analyzer 202 performs a static analysis on the program code to generate a plurality of static analysis alarms in the program code, along with identifying the program points that are safe and errors. The static analysis alarms generated by the static analyzer 202 are termed as 'original static analysis alarms'. Here the term 'original' refers to static analysis alarms that are reported by the static analyzer 202 in the program code prior to repositioning. The 'original static analysis alarms' are alternately referred to as 'alarms' throughout the description and claims. The static analyzer 202 may use any appropriate technique to perform the static analysis of the program code. For example, consider 'code 1'. For 'code 1' the alarms $A_{10}$, $A_{15}$, $D_{38}$, $D_{42}$, $D_{45}$, and $D_{48}$ are the alarms generated by performing the static analysis by the static analyzer 202. Hence, these are examples of the original static analysis alarms.

The NCDs/ICDs computer 204 collects information pertaining to the alarms generated, and the program code along with other supporting data as input. The NCDs/ICDs computer 204 processes the collected inputs to compute transitive control dependencies of each of the alarms. The NCDs/ICDs computer 204 further computes each of the transitive control dependencies of the alarms as one of an impacting control dependency (ICD) or a non-impacting control dependency (NCD) of the corresponding alarm. The steps of computing the transitive control dependencies and then computing each of the transitive control dependencies as NCD/ICD are explained below:

NCD of any of the alarms is a transitive control dependency of the alarm's program point, which does not affect whether the alarm is an error. Similarly, ICD of any of the alarm is a transitive control dependency of the alarm's program point, which affects whether the alarm is an error. Let ra be an alarm reported in a program P, and n→n' is a transitive control dependency of $\phi$. Let P' be another program obtained from P by replacing the condition of branching node n with a non-deterministic choice function. The NCDs/ICDs computer 204 determines the dependency n→n' as an ICD of ra if ra is a false positive in P and an error in P'. Otherwise, the dependency n→n' is considered as an NCD of $\phi$ by the NCDs/ICDs computer 204.

Let $\phi_p$ be an alarm at a program point p. The idea behind NCD/ICD of an alarm is illustrated by categorizing effect of a transitive control dependency $$e \to \phi_p \text{ of } \phi_p, \text{ where } e=n \to n'.$$

The classification is based on values that can be assigned to variables in cond($\phi_p$), that is the variables present in the condition of the alarm $\phi_p$. The effect of the transitive control dependency e=n→n' on the alarm $\phi_p$ is illustrated by classifying and describing the values taken by variables in cond($\phi_p$) (that is the variables in the alarm condition) into the following cases.

Case 1: Variables in cond($\phi_p$) are assigned with safe values by their corresponding data dependencies and hence $\phi_p$ is a false positive. In this case the transitive control dependency e is an NCD of $\phi_p$, that is replacing condition of the branching node n, the source node of e, by a non-deterministic choice function that does not cause $\phi_p$ to be an error.

Case 2: Variables in cond($\phi_p$) are assigned with unsafe values by their corresponding data dependencies and hence $\phi_p$ is an error if the unsafe values reach the program point p. In this case effect of the transitive control dependency e is in one of the following two ways depending on whether the unsafe values reach the program point p.

Case 2.1: If the condition cond(e) prevents flow of the unsafe values from reaching $\phi_p$, then $\phi_p$ is a false positive. In this case, if the condition of the source node n of e is replaced by a non-deterministic choice function, the alarm is an error as the unsafe values reach $\phi_p$. That is, e affects whether $\phi_p$ is an error or a false positive. Thus, in this case, e is considered as an ICD of $\phi_p$, and cond(e) is considered as a safety condition for $\phi_p$ because e prevents the alarm from being an error. For example, in 'Code 2', the transitive control dependency $n_7 \rightarrow n_8$ is ICD of $A_8$.

```
1 void f1 (int p, int q) {
2 int t, arr [10], i=readInt ( );
3
4 if (p==1)
5 i=0;
6
if (p==1)
8 arr[i]=0;   A8
9 if (q==5){
10 arr[i]=1;   A10
11 print (20/i);   D11
12 }
13
14 if (q==5)
15 t=arr[i];   A15
16 }
```

Code 2

Class 2.2: If the condition cond(e) does not prevent flow of the unsafe values from reaching $\phi_p$, then $\phi_p$ is an error. In this case, if the condition of the source node n of e is replaced by a non-deterministic choice function, the alarm still remains an error. That is, e does not affect whether $\phi_p$ is an error or a false positive. Thus, in this case, e is considered as an NCD of $\phi_p$. For example, in 'Code 2', the control dependency $n_9 \rightarrow n_{10}$ is NCD of $D_{11}$.

The NCDs/ICDs computer 204 computes a transitive control dependency $e \rightarrow \phi$ as NCD or ICD of the alarm ra using one or more techniques. In one embodiment, the NCDs/ICDs computer 204 computes a transitive control dependency of $e \rightarrow \phi$ as NCD or ICD based on the alarms that are similar to $\phi$. Let $\phi_s$ be the set of similar alarms, the alarms in it are similar to $\phi$. The NCDs/ICDs computer 204 computes a transitive control dependency of $e \rightarrow \phi$ as NCD if there exists a path reaching an alarm $\phi'_p \in \phi_s$ without having a dependency $e' \rightarrow \phi'_p$ on it such that e and e' are condition-wise equivalent. For example, in 'Code 1', control dependencies of D38 and D45 are considered as NCDs using this computation method by the NCDs/ICDs computer 204.

In other words, when $\phi \in \phi_s$, $e \rightarrow \phi$ and a condition equivalent to cond(e) appears on every path to each of the similar alarms $\phi_s$, then e is an ICD of $\phi$. Otherwise e is an NCD of $\phi$.

After each control dependency of each of the original static analysis alarms is determined as either NCD or ICD by the NCDs/ICDs computer 204, the repositioning performer 208 performs repositioning of the alarms based on the NCDs/ICDs computed for those alarms. The repositioning performer 208 first identifies the locations where groups of original similar alarms can be safely repositioned, and later it creates new alarms at those identified locations. Let $\phi_s$ be a set of one or more alarms such that the alarms in it are similar alarms. Let R be the set of alarms resulting after the repositioning of alarms performed by the repositioning performer 208, that is R is set of newly created alarms after the repositioning. The repositioning performed by the repositioning performer 208 is required to satisfy the following conditions.

Condition/Constraint 1 (C1): The program points of the repositioned alarms R together dominate the program point of every alarm $\phi \in \phi_s$, so that when the repositioned alarms R are false positives, the original alarms $\phi_s$ are also false positives.

Condition/Constraint 2 (C2): All the paths between the repositioned alarms R and every alarm $\phi \in \phi_s$ does not have an ICD of ra (that is, all the control dependencies of an alarm $\phi \in \phi_s$ along a path between the repositioned alarms R and $\phi$ are NCDs).

Condition 3/Constraint (C3): The number of the repositioned alarms R is not greater than the number of original alarms $\phi_s$.

The constraint C1 ensures that when $\phi \in \phi_s$ is an error, at least one of the repositioned alarms R is also an error. Thus, the repositioning is safe, and the repositioned alarms R together act as dominant alarms of the original alarms $\phi_s$. However, as the repositioned alarms are newly created, C1 cannot guarantee that when a repositioned alarm $r_p \in R$ is an error, at least one of the corresponding original alarms $\phi' \subseteq \phi_s$ is an error. That is, $r_p$ may detect an error spuriously. The spurious error detection occurs only when every path between $r_p$ and each $\phi \in \phi'$ has an ICD of $\phi$.

To overcome the problem of la repositioned alarm detecting a spurious error, the second constraint C2 is added. C1 and C2 together guarantees that when a repositioned alarm is an error, at least one of its corresponding original alarms is also an error, and vice versa. In other words, when the repositioned alarms R are false positives, the original alarms $\phi_s$ are also false positives, and vice versa. As NCDs-based repositioning creates new alarms, the third constraint C3 is used to ensure that the repositioning never results in more alarms than the number of alarms given for repositioning. Thus, NCDs-based repositioning performed with constraints C1, C2, and C3 is safe, without spurious error detection by the repositioned alarms, and without increasing the overall number of alarms.

The repositioning performer 208 uses one or more appropriate techniques to perform the repositioning of the original alarms, satisfying the aforementioned conditions. In an embodiment, the repositioning performer 208 computes groups of similar alarms first and later identifies the locations satisfying the three constraints by traversing over the control flow graph of the program code. In another embodiment, the repositioning performer 208 uses one or more techniques based on data flow analysis or abstract interpretation and so on to compute the locations where the groups of similar alarms are to be repositioned and in turn for the computation of the repositioned alarms. In the following description, one of such techniques that is based on data flow analysis is presented. This technique is called live conditions analysis. The process/step of computation of the repositioned alarms by the repositioning performer 208 is elaborated by citing the live conditions analysis. However, it is to be noted that the explanation citing the live conditions analysis is not intended to restrict the scope in any manner and is for example purpose only. The repositioning performer 208 determines one or more locations in the program code the alarms can be repositioned to, using the repositioning locations identifier 214, and later computes repositioned alarms (using the repositioned alarms computer 216) during the repositioning of the alarms. The repositioning performer 208 may use any suitable technique for determining the one or more locations. For example, the technique used for determining the one or more locations is a live conditions analysis. The process of determining the one or more locations is explained based on the live conditions analysis. However, it is to be noted that any other suitable technique may be used, and the following description of live conditions analysis is not intended to restrict scope in any manner.

Live Conditions Analysis:

An alarm condition c is considered to be live at a program point p, if a path from p to program exit contains an alarm ra reported at a program point q with c as alarm condition, and path segment from p to q is definition free for any operand of c.

For example, in 'Code 1', condition ny≠0 is live at exit ($n_{34}$) due to the alarms $D_{42}$ and $D_{48}$. However the same condition is not live at entry ($n_{33}$).

During the live conditions analysis, the repositioning locations identifier 214 propagates alarm conditions of a given set of original alarms φ in backward direction (i.e. backward propagation) by computing them as live-alarm conditions (liveConds). The repositioning locations identifier 214 uses a data-flow analysis to compute the liveConds at every program point in the program. The liveConds analysis is done to compute repositioned alarms for the set of original alarms, φ. For each liveCond l that is being computed at a program point p, the following information also are computed.

1. The original alarm(s) due to which l is a liveCond at p. Such alarms as referred to as original alarms (relOrigAlarms) of l.

2. The program point(s) that are later used to create repositioned alarms. A (new) repositioned alarm with l as its alarm condition is created at each of these program points. In other words, these program points denote the locations where the relOrigAlarms of l are to be repositioned. Thus, these program points are referred to as repositioning locations (reposLocations) of l. A reposLocation of l is either the location of an original alarm due to which l is a liveCond at p, or a program point computed during a backward propagation operation.

3. Transitive control dependencies of the reposLocations of l such that for every dependency there exists a condition-wise equivalent dependency on all the paths from p to every reposLocation. These dependencies are referred to as relatedICDs of l, because their conditions denote at least one safety condition of the alarms that will get created at the reposLocations of l.

In an alternate embodiment, the repositioning performer 208 also may compute NCDs and ICDs of the alarms. To compute traceability links between the repositioned alarms and their corresponding original alarms (and vice versa), the relOrigAlarms of l reposLocation-wise are computed: reposLocations of l are the program points where relOrigAlarms of l are to be repositioned. These alarms computed corresponding to a reposLocation p are referred to as relOrigAlarms of p. The relOrigAlarms of l can be obtained by collecting together the relOrigAlarms of reposLocations of l.

The following description elaborates the steps carried out by the NCDs-based repositioner 206 with the help of an algorithm. Let $\langle \aleph, \varepsilon \rangle$ be the control flow graph of the program: $\aleph$ is the set of nodes and E is the set of edges. Let $\mathcal{P}$ be the set of all program points in the program. Let $\varepsilon_c \subseteq \varepsilon$ be the set of all conditional edges in the CFG, i.e., the set of all transitive control dependencies of each $p \in \mathcal{P}$. Let L be the set of all alarm conditions of a given set of original alarms φ. Thus, the liveConds computed by the liveConds analysis at a program point are given by a subset of L For a liveCond l computed at a program point p, the reposLocations of l and their corresponding relOrigAlarms are given by a subset of $2^A$ where $A=\mathcal{P} \times 2^\Phi$). The values computed for a liveCond l, reposLocations (with their corresponding relOrigAlarms) and its relatedICDs are given by an element of X, where $X=2^A \times 2^{\varepsilon_c}$. A function $f: L \to X$ that maps a liveCond $l \in L$ to a pair of its reposLocations $A \in 2^A$ and relatedICDs $E \in 2^{\varepsilon_c}$. The liveCond l with the mapped values is expressed as a tuple $\langle l, A, E \rangle$. At a program point p, the liveConds analysis computes a subset of $L_b$ where $L_b = \{\langle l, A, E \rangle | l \in L, f(l) = \langle A, E \rangle\}$.

For a given set $S \subseteq L_b$ and $A \in 2^A$, the following are defined:

Code 3

$condsIn(S) = \{l | \langle l, A', E' \rangle \in S\}$ is the set of *all liveConds* in S.

$points(A) = \{p | \langle p, \Phi' \rangle \in A\}$ is the set of all *reposLications* in A.

$origAlarms(A) = \cup_{\langle p, \Phi' \rangle \in A} \Phi'$ is the set of all *relOrigAlarms* in A.

$$\text{Given } S, S' \in \mathcal{B} \quad (1)$$
$$S \cap_{\Pi \mathcal{B}} S' = \bigcup_{l \in (condsIn(S) \cup condsIn(S'))} \{meetInfo(l, n, S, S')\}$$

$$meetInfo(l, n, S, S') = \quad (2)$$
$$\begin{cases} merge(l, n, A, E, A', E') \langle l, A, E \rangle \in S, \langle l, A, E \rangle \in S' \\ \langle l, A, E \rangle \langle l, A, E \rangle \in S, l \notin condsIn(S') \\ \langle l, A', E' \rangle \langle l, A', E' \rangle \in S', l \notin condsIn(S) \end{cases}$$

$$merge(l, n, A, E, A', E') = \quad (3)$$
$$mergeInfo(l, n, A, A', meetICDsInfo(E, E'))$$

$$meetICDsInfo(E, E') = \quad (4)$$
$$\left\{ e, e' \middle| \begin{array}{c} e \in E, e' \in E', \\ e \text{ and } e' \text{ are equivalent } conditionwise \end{array} \right\}$$

$$mergeInfo(l, n, A, A', E) = \quad (5)$$
$$\begin{cases} \langle l, reposAlarm(n, A, A'), \emptyset \rangle \text{ points } (A) \neq points(A'), E = \emptyset \\ \langle l, A \cup A', E \rangle \text{ otherwise} \end{cases}$$

$$reposAlarm(n, A, A') = \{\langle entry(n), origAlarms(A) \cup origAlarms(A') \rangle\} \quad (6)$$

As the liveCond analysis computes subsets of Lb flow-sensitively at every program point $p \in \mathcal{P}$, lattice of these values are denoted as $$\langle \mathcal{B} = 2^{L_b}, n_{\Pi \mathcal{B}} \rangle.$$

'meet' of values flowing in at exit of branching node n. An assumption made at this stage is that the branching node n corresponding to a meet operation is known when the meet is performed. Meet operation for a liveCond l in equations 1 through 6 in 'Code 3' is explained as:

Code 4 let $m, n \in \mathcal{N}; e \in \varepsilon; \emptyset, \emptyset' \in \Phi; l, l' \in L; S \in B$ $$Out_n = \begin{cases} \emptyset & n \text{ is end of node} \\ \prod_{m \in pred(n)^B} Edge_{e=n \to m}(In_m) & \text{otherwise} \end{cases} \quad (7)$$

$$Edge_{e=n \to m}(S) = \{\langle l, A, E \cup handleCtrlDep(e, A)\rangle \mid \langle l, A, E \rangle \in S\} \quad (8)$$

$handleCtrlDep(e, A) =$
$\begin{cases} \{e\} & e \text{ is a transitive control depdnency of } p \in \text{ points}(A) \\ \emptyset & \text{otherwise} \end{cases}$ $$In_n = Gen_n(Survived_n) \cup (Survived_n \setminus GenRemoved(Survived_n)) \quad (9)$$

$$Survived_n = processForICDsKill(n, Out_n \setminus Kill_n(Out_n)) \quad (10)$$

$$Kill_n(S) = \left\{ \langle l, A, E \rangle \mid \begin{array}{l} \langle l, A, E \rangle \in S, n \text{ contains a definition} \\ \text{of an operand } l \end{array} \right\} \quad (11)$$

$processForICDsKills(n, S) = \quad (12)$
$\{\langle l, A, E \text{ killICDs}(E, n)\rangle \mid \langle l, A, E \rangle \in S\}$ $$killICDs(E, n) = \left\{ e \mid \begin{array}{l} e \in E, \text{ and } n \text{ contains a definition of} \\ \text{an operand of } cond(e) \end{array} \right\} \quad (13)$$

$Gen_n(S) = \quad (14)$
$\{createLiveCond(\Phi, n, s) \mid n \text{ has alarm } \emptyset \in \Phi \text{ reported for it}\}$ $createLiveCond(\Phi, n, S) = \quad (15)$
$\begin{cases} createInfo(\Phi, n\{\Phi\} \cup origAlarms(R)) & \langle l, R, C \rangle \in S, cond(\Phi) = l \\ createInfo(\Phi, n\{\Phi\}) & \text{otherwise} \end{cases}$ $$createInfo(\Phi, n, \Phi') = \langle cond(\emptyset), \{\langle entry(n), \Phi' \rangle\}, \emptyset \rangle \quad (16)$$

$GenRemoved_n(S) =$
$\left\{ \langle l, A, E \rangle \mid \begin{array}{l} n \text{ has alarm } \emptyset \in \Phi \text{ reported for it,} \\ \langle l, A, E \rangle \in S, l = cond(\emptyset) \end{array} \right\}$ Code 4 shows data flow equations of liveConds analysis that computes liveConds in an intraprocedural setting. $Out_n$ and $In_n$ denote values computed by liveConds analysis respectively at exit and entry point of a node n (equations 7 and 9 respectively).

Equation 14 indicates that a liveCond l is generated for every original alarm ra reported for a node n, with empty set (denoted as 0) as relatedICDs of l, and entry(n) as only reposLocation of l. When the same liveCond l also flows in at entry(n) from a successor of n, (1) the relOrigAlarms of the liveCond flowing in are also added to relOrigAlarms of the reposLocation entry(n) as depicted in equation 15, and (2) propagation of the values of l flowing in at entry(n) is stopped as depicted in equation 16. By using this computation and the meet operation, the repositioning locations identifier 214 ensures that at any program point there exists only one tuple for a liveCond and the values computed for it. The reposLocations of a liveCond are updated only when the liveCond is generated or when the meet operation is performed.

Updates to relatedICDs of a liveCond l are as follows: (1) when l gets propagated through a transitive control dependency e of its reposLocation, e is added to relatedICDs of l as depicted in equation 8. (2) For a relatedICD e of l, if an assignment node assigns value to a variable in cond($\phi$), then e is removed from the relatedICDs of l, as in equation 12.

For example, in code 1, nx≠0 and ny≠0 are two liveConds computed by liveConds analysis at entry($n_{34}$) i.e. in $In_{34}$. At this point the reposLocations and relatedICDs of the first liveCond nx≠0 respectively are $\{ \langle entry(n_{37}), \{D_{38}, D_{45}\} \rangle \}$ and empty set. The reposLocations (with their relOrigAlarms) and relatedICDs of the second liveCond ny≠0 respectively are $\{ \langle entry(n_{41}), \{D_{42}, D_{48}\} \rangle \}$ and empty set.

Results of the liveConds analysis are further used by the repositioned alarms computer 216 to create repositioned alarms for the original static analysis alarms $\phi$ input for the repositioning. For a liveCond computed at a program point p, a repositioned alarm $\langle l, q \rangle$ is created at a reposLocation q of l. The relOrigAlarms of q are identified as original alarms corresponding to the repositioned alarms $\langle l, q \rangle$, and uses this information to further compute traceability links between the original alarms and the repositioned alarms. To avoid creating duplicate repositioned alarms, the repositioned alarms computer 216 does not create the repositioned alarm $\langle l, q \rangle$ if: (1) a repositioned alarm $\langle l', q \rangle$ similar to $\langle l, q \rangle$ is already created, or (2) the node n corresponding to q has an original alarm $\phi$ and cond($\phi$)=l.

At every program point p, liveConds that are liveConds at p but not at a program point just prior to p are collected, and this information is used to create the repositioned alarms. The liveConds to be collected are the liveConds that are killed at every node n, represented as '$Kill_n(Out_n)$'. This approach to collect the liveConds removes redundancy in creating the repositioned alarms. In an embodiment, the repositioned alarms computer 216 collects liveConds that reach the procedure entry ($In_{start}$), because a live condition can reach this point when all the variables in the liveCond are local and uninitialized.

This approach to collect the liveConds for creating the repositioned alarms ensures the following: each liveCond l that got generated at p due to an original alarm $\phi_p \in \phi$ gets collected and used to create a repositioned alarm along every path starting at the program entry and ending at p. As a result, along every path reaching p, there exists a repositioned alarm with l=cond($\phi_p$) as corresponding alarm condition. As a consequence of this, the repositioned alarms corresponding to the original alarm $\phi_p$ together dominate $\phi_p$. This indicates that the repositioning of the original alarms $\phi$ thus obtained is safe, i.e., the repositioning satisfies the constraint C1. The Equations 1, 8, and 12 together indicate that a repositioned alarm is created only when the constraint C2 is satisfied.

In the aforementioned process, the repositioning locations identifier 214 performs propagation of the live-alarm conditions by considering effect of the ICDs/NCDs such that at each ICD the back propagation is terminated, and at each NCD the backward propagation is continued upwards. In an embodiment, the repositioning performer 208 computes the NCDs/ICDs of the alarms first, and then determines the one or more locations where each of the alarms can be repositioned to. In another embodiment, the computation of the NCDs/ICDs and determining the one or more locations for repositioning each of the alarms are performed simultaneously by the repositioning performer 208.

After repositioning the alarms, the post-processor 210 post-processes the information pertaining to the repositioned alarms so as to minimize the number of the repositioned alarms. The post-processing of the repositioned alarms takes place in 4 stages 1) discarding redundant repositioning of the alarms, 2) merging of the repositioned alarms, 3) clustering of the repositioned alarms, and 4) fall back computation. A redundant repositioned alarms discarder 218 of the post-processor 210 collects information pertaining to at least the repositioned alarms as input, and checks for repositioned alarms that are false positives. If any of the repositioned alarms is identified as false-positive, the same is discarded by the redundant repositioned alarms discarder 218. The repositioned alarms merger 220 of the post-processor 210 collects information pertaining to at least the repositioned alarms as input, and checks for repositioned alarms that are similar and are created at the same program points, and merges all the identified repositioned alarms. The alarms clusterer 222 performs grouping of the repositioned alarms, so as to eliminate presence of follower alarms among the repositioned alarms. The fallback performer 224 collects information pertaining to the repositioned alarms after the grouping as input, and computes if repositioning of a group of similar alarms increases overall count of alarms in the program code, that is, if their corresponding repositioned alarms are more in number than the number alarms in the group of similar alarms, and if yes, then it discards the repositioned alarms and restores the original similar alarms.

In the next step, the traceability links computer 212 computes traceability links between each of the repositioned alarms and the corresponding original alarms, and accordingly the traceability links are established. Information pertaining to the repositioned alarms, and the corresponding traceability links may be then reported to the user(s) via appropriate user interface provided by the repositioned alarms presenter 226. In another embodiment, the program code may be rewritten by incorporating reference to the alarms, the repositioned alarms, and the corresponding traceability links, and may be presented to the user.

FIG. 3 is a flow diagram depicting steps involved in the process of repositioning of original static alarms in a program code by considering effect of Non-impacting control dependencies (NCDs) and impacting control dependencies (ICDs) of static alarms in a program code, using the system of FIG. 1, according to some embodiments of the present disclosure. In this method, initially a program code for which repositioning of the alarms is to be performed is collected as input (step 302). Then a static analysis of the program code is performed to generate original static alarms in the program code (step 304). Further, transitive control dependencies of each of the alarms are computed, and further each of the transitive control dependencies of each of the alarms is computed as one of a non-impacting control dependency (NCD) and an impacting control dependency (ICD) (step 306). Further, one or more locations in the program code where each of the alarms can be repositioned to, are determined using one or more suitable techniques, by considering effect of the NCDs/ICDs of the alarms (step 308).

Based on the one or more locations determined for repositioning of alarms, repositioned alarms corresponding to each of the alarms are created (step 310). Further, by performing post-processing of the repositioned alarms, number of repositioned alarms is reduced (step 312). Further, traceability links between the repositioned alarms and the corresponding alarms is computed (step 314). In various embodiments, the steps in method 300 may be performed in the same order or in any different order that is technically feasible. In another embodiment, one or more steps in method 300 may be omitted.

FIG. 4 is a flow diagram depicting steps involved in the process of post-processing repositioned static alarms, using the system of FIG. 1, in accordance with some embodiments of the present disclosure. The information pertaining to at least the repositioned alarms is collected as input for the post-processing step. Initially, the post-processor 210 determines one or more of the repositioned alarms as false positives (step 402), and all the repositioned alarms that are determined as the false positives are removed (step 404). The post-processor 210 further identifies and merges repositioned alarms that are similar and are located in the same program points (step 406). Further, grouping of the repositioned alarms is performed so as to remove follower alarms that are redundant in presence of other alarms (step 408). The post-processor 210 further determines one or more instances in which repositioned alarms exceeds in their number than their corresponding original static analysis alarms, and if any such instances are detected, the repositioning is restored so as to generate a final set of repositioned alarms (step 412). In various embodiments, the steps in method 400 may be performed in the same order or in any different order that is technically feasible. In another embodiment, one or more steps in method 400 may be omitted.

Experimental Results a) Initial Setup and Experiment:

Performance of the system 100 for NCDs-based repositioning was evaluated in different contexts by selecting 32 applications that belonged to the following three categories: (i) 16 open source applications written in C and previously used as benchmarks for evaluating state of the art alarms clustering and repositioning techniques; (ii) 11 industry C applications from the automotive domain; and (iii) 5 industry COBOL applications from the banking domain.

The applications were analyzed a proprietary static analysis tool TCS ECA for five commonly checked categories of run-time errors: array index out of bounds (AIOB), division by zero (DZ), integer overflow underflow (OFUF), uninitialized variables (UIV), and illegal dereference of a pointer (IDP). IDP is not applicable for COBOL. The generated alarms were post-processed using appropriate alarms clustering techniques and then the resulting dominant alarms are post-processed using the state-of-the-art repositioning technique. The resulting repositioned alarm were provided as input to NCDs-based repositioning being performed by the system 100. All the applications in the three sets were analyzed and the alarms were post-processed.

b) Results

TABLE 1a

| Application | Size (KLOC) | Input alarms | % Reduction | Time (mins) | % Overhead |
|---|---|---|---|---|---|
| archimedes 0.7.0 | 0.8 | 2275 | 10.55 | 1.9 | 24.5 |
| polymorph 0.4.0 | 1.3 | 25 | 12.00 | 0.6 | 27.5 |
| acpid-1.0.8 | 1.7 | 25 | 8.00 | 0.4 | 23.5 |
| spell-1.0 | 2.0 | 71 | 5.63 | 0.8 | 18.4 |
| nlkain-1.3 | 2.5 | 319 | 1.57 | 0.5 | 15.7 |

TABLE 1a-continued

| Application | Size (KLOC) | Input alarms | % Reduction | Time (mins) | % Overhead |
|---|---|---|---|---|---|
| stripcc-0.2.0 | 2.5 | 229 | 8.30 | 1.0 | 16.8 |
| ncompress-4.2.4 | 3.8 | 92 | 3.26 | 0.5 | 23.6 |
| barcode-0.96 | 4.2 | 1064 | 9.02 | 2.4 | 17.7 |
| barcode-0.98 | 4.9 | 1310 | 9.08 | 2.8 | 15.7 |
| combine-0.3.3 | 10.0 | 819 | 23.57 | 4.3 | 55.3 |
| gnuchess-5.05 | 10.6 | 1783 | 15.09 | 8.6 | 95.4 |
| antiword-0.37 | 27.1 | 613 | 9.95 | 26.7 | 72.2 |
| sudo-1.8.6 | 32.1 | 7433 | 8.69 | 133.2 | 22.5 |
| uucp-1.07 | 73.7 | 2068 | 6.58 | 21.6 | 7.5 |
| ffmpeg-0.4.8 | 83.7 | 45137 | 10.41 | 239.0 | 11.6 |
| sphinxbase-0.3 | 121.9 | 1516 | 5.67 | 6.5 | 17.3 |

TABLE 1b

| Application | Size (KLOC) | Input alarms | % Reduction | Time (mins) | % Overhead |
|---|---|---|---|---|---|
| C App 1 | 3.4 | 383 | 12.79 | 1.8 | 13.3 |
| C App 2 | 14.6 | 422 | 2.37 | 4.5 | 15.8 |
| C App 3 | 18.0 | 441 | 22.00 | 4.0 | 12.4 |
| C App 4 | 18.1 | 1055 | 20.47 | 5.6 | 23.7 |
| C App 5 | 18.3 | 535 | 23.55 | 4.7 | 12.5 |
| C App 6 | 30.5 | 1001 | 29.77 | 5.1 | 23.4 |
| C App 7 | 30.9 | 1379 | 17.19 | 42.3 | 2.8 |
| C App 8 | 34.6 | 23404 | 4.28 | 186.9 | 17.8 |
| C App 9 | 111.0 | 2241 | 12.72 | 7.0 | 22.2 |
| C App 10 | 127.8 | 987 | 12.97 | 1.8 | 21.7 |
| C App 11 | 187.2 | 4494 | 18.09 | 36.2 | 36.7 |
| COBOL 1 | 11.4 | 341 | 5.57 | 1.1 | 78.3 |
| COBOL 2 | 11.9 | 601 | 28.62 | 7.1 | 20.9 |
| COBOL 3 | 16.7 | 499 | 0.40 | 6.4 | 179.4 |
| COBOL 4 | 26.8 | 1158 | 32.21 | 25.7 | 63.0 |
| COBOL 5 | 37.8 | 1826 | 36.09 | 3.7 | 80.0 |

Evaluation results are given in tables 1(a) and 1(b). Table 1(a) contains results of validation of open source applications and Table 1(b) contains results of validation of industry applications. The column Input Alarms presents the number of alarms that were given as input to the system 100, while the column % Reduction presents the percentage reduction achieved in the number of alarms by the system 100, by using the NCDs-based repositioning of the alarms. The evaluation results indicate that, compared to state-of-the-art repositioning techniques, the NCDs-based repositioning technique reduces the number of alarms on the three sets of applications—open source, C industry, and COBOL industry by up to 23.57%, 29.77%, and 36.09% respectively. The median reductions are 9.02%, 17.18%, and 28.61%, respectively. Moreover, the average reductions respectively are 10.16%, 8.97%, and 27.68%.

The column Time in Table 1 a and Table 1 b presents the time taken to (i) analyze the applications for the aforementioned five properties, (ii) post-process the TCS ECA-generated alarms using the clustering and the state-of-the-art repositioning techniques. The columns % Overhead presents the performance overhead incurred due to the extra time taken by the NCDs—based repositioning technique. The performance overhead added is considered as acceptable because the alarms reduction can be expected to reduce the users' manual effort which is much more expensive than machine time. Moreover, the reduced alarms may result in performance gain when the alarms are post-processed for false positives elimination using time-expensive techniques such as model checking.

Other observations: (1) Reduction in the number of alarms generated for each of the properties selected was measured. The median reductions computed property-wise on all the applications, are 25.8% (AIOB), 45.72% (DZ), 6.89% (OFUF), 18.17% (UIV), and 10.3% (IDP). (2) The fallback got applied in 2592 instances during the NCDs-based repositioning of the total 105,546 alarms. (3) Around 43% of the dominant alarms resulting after the NCDs-based repositioning on the open source applications are found to be similar alarms, and 64% of these similar alarms appear in the repositioning limitation scenarios. A manual analysis of 200 alarms appearing in these limitation scenarios showed they are not merged together due to (i) presence of common safety conditions (ICDs), (ii) limitations in our implementation to compute the liveConds inter-functionally, or (iii) the fallback got applied.

Evaluation of Spurious Error Detection by the Repositioned Alarms: A repositioned alarm obtained through repositioning based on the approximated NCDs can be a spurious error. A repositioned alarm is a spurious error when a NCD computed by the system 100 is actually an ICD. To measure the spurious error detection rate, 150 repositioned alarms that were created due to merging of two or more similar alarms were manually analyzed, wherein each repositioned alarm selected has two or more original alarms corresponding to it. The analyzed alarms are randomly selected from the repositioned alarms generated on the first nine open source applications (Table 1 a) and two industry applications (C applications 4 and 7 in Table 1 b). These selected 150 repositioned alarms have in total 482 original alarms corresponding to them. Another manual analysis was conducted to check each of the selected alarms to determine whether the alarm being checked is a spurious error or not. It was found that three repositioned alarms were spurious errors, and thus, the spurious error detection rate was 2%. This indicates that the approach used by the system 100 for determining the NCDs/ICDs of similar alarms is effective, and for the analyzed cases, the NCDs-based repositioning technique reduced the number of alarms by 70% but at the cost of detecting a few spurious errors (2%).

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for reducing number of static analysis alarms in a program code by repositioning the static analysis alarms, comprising:
    collecting the program code as input, via one or more hardware processors;
    generating a plurality of original static analysis alarms by performing a static analysis on the program code, via the one or more hardware processors;
    computing all transitive control dependencies of each of the plurality of original static analysis alarms, via the one or more hardware processors;
    computing each of the transitive control dependencies of each of the plurality of original static analysis alarms as one of a non-impacting control dependency and an impacting control dependency to each of the plurality of alarms, via the one or more hardware processors;
    computing one or more locations in the program code where each of the plurality of original static alarms can be repositioned to, by considering effect of the impacting control dependencies and the non-impacting control dependencies computed corresponding to each of the original static analysis alarms, via the one or more hardware processors;
    creating one or more repositioned alarms corresponding to each of the plurality of original static analysis alarms based on the one or more locations computed corresponding to each of the original alarms, via the one or more hardware processors;
    performing post-processing of each of the repositioned alarms to reduce number of the repositioned alarms, via the one or more hardware processors; and
    computing traceability links between each of the one or more repositioned alarms and corresponding original static analysis alarms generated in the program code, via the one or more hardware processors.

2. The method as claimed in claim 1, wherein computing the control dependencies of an original static alarm comprises computing one or more controlling conditions which determine whether a program point of the original static alarm can be reached or not during execution of the program code.

3. The method as claimed in claim 1, wherein computing a control dependency as a non-impacting control dependency (NCD) of an original static analysis alarm comprises determining that the transitive control dependency of a program point of the alarm does not affect whether the alarm is an error or a false positive.

4. The method as claimed in claim 1, wherein computing a control dependency as an impacting control dependency (ICD) of an original static analysis alarm comprises determining that the transitive control dependency of a program point of the alarm affects whether the alarm is an error or a false positive.

5. The method as claimed in claim 1, wherein a live conditions analysis is performed to compute the one or more locations in the program code where each of the plurality of original static alarms can be repositioned to, wherein performing the live conditions analysis comprises computing a plurality of live conditions corresponding the plurality of the original static analysis alarms along with the locations for repositioning each of the original static analysis alarms, wherein a live condition is generated corresponding to each of the original static analysis alarms and is propagated backward.

6. The method as claimed in 5, wherein performing the live conditions analysis comprises stopping propagation of each of the live conditions generated for each original static analysis alarm at any of the ICDs of the alarm.

7. The method as claimed in claim 5, wherein performing the live conditions analysis comprises propagating each live condition generated for each original static analysis alarm upward through each of the NCDs of the alarm.

8. The method as claimed in claim 1, wherein computing the one or more locations in the program code where each of the plurality of original static alarms can be repositioned to, comprises traversing over a control flow graph of the program code to determine the one or more locations where the original static analysis alarms are to be repositioned.

9. The method as claimed in claim 1, wherein performing the post-processing of each of the repositioned alarms comprising:
    removing one or more of the repositioned alarms that are determined as the false positives;
    identifying and merging repositioned alarms that are similar and are located at same program point;
    performing grouping of the repositioned alarms to eliminate follower alarms present in the repositioned alarms;
    identifying one or more instances in which number of repositioned alarms created exceeds corresponding one or more original static analysis alarms; and
    creating the final set of the repositioned alarms by discarding the repositioned alarms and including the corresponding original alarms, in the identified one or more instances.

10. A system for reducing number of static analysis alarms in a program code by repositioning the static analysis alarms, comprising:
    one or more hardware processors;
    one or more communication interfaces; and
    one or more memory storing a plurality of instructions, wherein the plurality of instructions when executed cause the one or more hardware processors to:
    collect the program code as input;
    generate a plurality of original static analysis alarms by performing a static analysis on the program code;
    compute all transitive control dependencies of each of the plurality of original static analysis alarms;
    compute each of the transitive control dependencies of each of the plurality of original static analysis alarms as one of a non-impacting control dependency and an impacting control dependency to the original static analysis alarm;
    compute one or more locations in the program code where each of the plurality of original static alarms can be repositioned to, by considering effect of the impacting control dependencies and the non-impacting control dependencies computed corresponding to each of the plurality of original static analysis alarms;

create one or more repositioned alarms corresponding to each of the plurality of original static analysis alarms based on the one or more locations computed corresponding to each of the original alarms;

perform post-processing of each of the one or more repositioned alarms to reduce number of the repositioned alarms; and compute traceability links between each of the one or more repositioned alarms and corresponding original static analysis alarms generated in the program code.

11. The system as claimed in claim 10, wherein the system computes the control dependencies of an original static alarm by computing one or more controlling conditions which determine whether a program point of the original static alarm can be reached or not during execution of the program code.

12. The system as claimed in claim 10, wherein the system computes a control dependency as a non-impacting control dependency (NCD) of an original static analysis alarm by determining that the transitive control dependency of a program point of the alarm does not affect whether the alarm is an error or a false positive.

13. The system as claimed in claim 10, wherein the system computes a control dependency as an impacting control dependency (ICD) of an original static analysis alarm by determining that the transitive control dependency of a program point of the alarm affects whether the alarm is an error or a false positive.

14. The system as claimed in claim 10, wherein the system performs a live conditions analysis to compute the one or more locations in the program code where each of the plurality of original static alarms can be repositioned to, wherein performing the live conditions analysis comprises computing a plurality of live conditions corresponding the plurality of the original static analysis alarms along with the locations for repositioning each of the original static analysis alarms, wherein a live condition is generated corresponding to each of the original static analysis alarms and is propagated backward.

15. The system as claimed in 14, wherein the system performs the live conditions analysis by stopping propagation of each of the live conditions generated for each original static analysis alarm at any of the CDs of the alarm.

16. The system as claimed in claim 14, wherein the system performs the live conditions analysis by propagating each live condition generated for each original static analysis alarm upward through each of the NCDs of the alarm.

17. The system as claimed in claim 10, wherein the system computes the one or more locations in the program code where each of the plurality of original static alarms can be repositioned to, by traversing over a control flow graph of the program code to determine the one or more locations where the original static analysis alarms are to be repositioned.

18. The system as claimed in claim 10, wherein the system performs the post-processing of each of the repositioned alarms by:

removing one or more of the repositioned alarms that are determined as the false positives;

identifying and merging repositioned alarms that are similar and are located at same program point;

performing grouping of the repositioned alarms to eliminate follower alarms present in each created group of repositioned alarms;

identifying one or more instances in which number of repositioned alarms created exceeds corresponding one or more original static analysis alarms; and creating the final set of the repositioned alarms by discarding the repositioned alarms and including the corresponding original alarms, in the identified one or more instances.

19. A non-transitory computer readable medium for reducing number of static analysis alarms in a program code by repositioning the static analysis alarms, the non-transitory computer readable medium reduces the number of static analysis alarms by:

collecting the program code as input, via one or more hardware processors;

generating a plurality of original static analysis alarms by performing a static analysis on the program code, via the one or more hardware processors;

computing all transitive control dependencies of each of the plurality of original static analysis alarms, via the one or more hardware processors;

computing each of the transitive control dependencies of each of the plurality of original static analysis alarms as one of a non-impacting control dependency and an impacting control dependency to each of the plurality of alarms, via the one or more hardware processors;

computing one or more locations in the program code where each of the plurality of original static alarms can be repositioned to, by considering effect of the impacting control dependencies and the non-impacting control dependencies computed corresponding to each of the original static analysis alarms, via the one or more hardware processors;

creating one or more repositioned alarms corresponding to each of the plurality of original static analysis alarms based on the one or more locations computed corresponding to each of the original alarms, via the one or more hardware processors;

performing post-processing of each of the repositioned alarms to reduce number of the repositioned alarms, via the one or more hardware processors; and computing traceability links between each of the one or more repositioned alarms and corresponding original static analysis alarms generated in the program code, via the one or more hardware processors.

* * * * *